United States Patent [19]

Zank

[11] Patent Number: 5,164,344
[45] Date of Patent: Nov. 17, 1992

[54] BOROSILAZANES AS BINDERS FOR THE PREPARATION OF SINTERED SILICON CARBIDE MONOLITHS

[75] Inventor: Gregg A. Zank, Midland, Mich.

[73] Assignee: Dow Corning Corporation, Midland, Mich.

[21] Appl. No.: 721,858

[22] Filed: Jun. 26, 1991

[51] Int. Cl.$^5$ ..................... C04B 35/52; C04B 35/56
[52] U.S. Cl. ..................... 501/90; 501/92; 501/96; 264/65; 264/66
[58] Field of Search ................. 501/88, 90, 92, 96

[56] References Cited

U.S. PATENT DOCUMENTS

| | | | |
|---|---|---|---|
| 4,004,934 | 1/1977 | Prochazka | 106/44 |
| 4,041,117 | 8/1977 | Prochazka | 264/63 |
| 4,081,284 | 3/1978 | Prochazka | 106/44 |
| 4,482,689 | 11/1984 | Haluska | 528/25 |
| 4,832,895 | 5/1989 | Johnson | 264/29.1 |
| 4,857,490 | 8/1989 | Johnson | 501/96 |
| 4,910,173 | 3/1990 | Niebylski | 501/97 |
| 4,962,069 | 10/1990 | Burns et al. | 501/90 |
| 5,010,045 | 4/1991 | Maya | 501/96 |
| 5,026,809 | 6/1991 | Dietmar et al. | 528/4 |

FOREIGN PATENT DOCUMENTS

| | | |
|---|---|---|
| 364323 | 10/1988 | European Pat. Off. |
| 3500962 | 1/1984 | Fed. Rep. of Germany |
| 60-16869 | 1/1985 | Japan |
| 2-84437 | 3/1990 | Japan |

OTHER PUBLICATIONS

Funayama et al., Int Symp on Organosilicon Chem Directed Towards Mat Sci, Ab, 95–96, Sendai (1990).
Seyferth et al, J Am Ceram Soc 73, 2131–2133 (1990).
Noth. B Anorg Chem Org Chem, 16(9) 618–621 (1961).

*Primary Examiner*—Mark L. Bell
*Assistant Examiner*—Alan Wright
*Attorney, Agent, or Firm*—Roger E. Gobrogge

[57] ABSTRACT

This invention relates to the preparation of highly densified ceramic bodies by the pyrolysis of a mixture comprising a preceramic borosilazane, silicon carbide powder, and, optionally, a curing agent for the borosilazane. Such highly densified ceramic bodies can be prepared by sintering under pressure or by a pressureless sintering process.

21 Claims, No Drawings

BOROSILAZANES AS BINDERS FOR THE PREPARATION OF SINTERED SILICON CARBIDE MONOLITHS

BACKGROUND OF THE INVENTION

This invention relates to the preparation of highly densified ceramic bodies by the pyrolysis of a novel mixture comprising a preceramic borosilazane, silicon carbide powder and, optionally, curing agents for the borosilazane. Such highly densified ceramic bodies can be prepared by sintering under pressure or by utilizing a pressureless process.

Silicon carbide ceramics are well known in the art to have very desirable chemical and physical stability properties at high temperatures. As such, they have found utility in numerous structural applications such as components for aircraft engines and motor vehicles and in various chemical process industries.

Traditionally, silicon carbide ceramics have been made by hot-pressing silicon carbide powder. Although effective, this technique is very expensive because of the high temperature and pressure required. Additionally, it is difficult to create complex shaped bodies by this process.

To avoid these disadvantages, various pressureless sintering methods have been developed. For instance, Prockazka in U.S. Pat. Nos. 4,004,934 and 4,041,117 and Prockazka et al. in U.S. Pat. No. 4,081,284 describe high density silicon carbide ceramic bodies prepared from mixtures consisting of silicon carbide powder, a boron-containing additive, and a carbonaceous additive. Ceramic silicon carbide materials with greater than 85% of theoretical density were obtained.

In addition, various sintering processes using organosilicon polymers are also known. For instance, Onda et al. in Japanese Kokai Patent 60-16869 describe high density silicon carbide ceramics obtained by the pressureless sintering of a mixture of silicon carbide powder, a sintering aid, and an organosilicon polymer characterized by a Si-C skeletal structure. Similarly, U.S. Pat. No. 4,962,069, assigned to the same assignee hereof, discloses sintering mixtures comprising a polysilazane polymer, silicon carbide powder and a sintering aid to form dense bodies.

Takamizawa et al. in German Patent No. 3,500,962 teach the formation of Dense SiC bodies by mixing a polymer having repeating Si-C and B-N bonds with silicon carbide powder and then firing the mixture. This reference, however, does not teach the use of the borosilazanes claimed herein and it does not teach the use of the claimed amounts of ingredients.

The present application discloses for the first time that high density, high strength ceramic products may unexpectedly be obtained by sintering a mixture comprising a preceramic borosilazane and silicon carbide powder.

SUMMARY OF THE INVENTION

The present invention relates to a method of preparing a handleable green body. The method comprises blending a novel, uniform mixture comprising silicon carbide powder, a preceramic borosilazane, and, optionally, curing agents for the borosilazane. The amount of the preceramic borosilazane present in said mixture is such that (a) the amount of boron is 0.1-3 weight percent based on the total weight of the silicon carbide powder and the char derived from the preceramic borosilazane and (b) the free carbon value of the mixture is greater than 0.1 weight percent based on the total weight of the silicon carbide powder and the char derived from the preceramic borosilazane. The amount of curing agent, if present, is an amount effective to crosslink the borosilazane. The mixture is then formed into the desired shape under pressure at a temperature less than about 500° C. to obtain said handleable green body.

The present invention also relates to a method of preparing a sintered body of silicon carbide. The method comprises sintering the handleable green body formed above in an inert atmosphere at a temperature greater than 1900° C. to obtain said sintered body which has a density greater than 2.6 g/cm$^3$.

DETAILED DESCRIPTION OF THE INVENTION

The present invention relates to the preparation of highly densified monolithic sintered bodies from a composition comprising preceramic borosilazane polymers and silicon carbide powder. The sintered bodies produced from the practice of this invention have densities greater than about 2.6 g/cm$^3$ which corresponds to about 80% of the theoretical density of silicon carbide (3.21 g/cm$^3$). Such highly densified bodies are useful as light weight refractory ceramics.

The products and processes of the present invention have several distinct advantages over prior art methods. First, the green bodies have high strengths, thus, facilitating handling and machining before sintering. Secondly, the use of a borosilazane eliminates the need to include additional sintering aids (e.g. boron or aluminum) and/or carbon sources into the preceramic mixture since both may be incorporated into the polymeric structure of said borosilazane. Thirdly, the incorporation of carbon and boron in the polymer insures that such agents are evenly distributed in the final mixture. This even distribution is essential to the formation of fully dense, flaw-free ceramics. Finally, the composition of the preceramic mixture can be varied to accommodate various molding techniques such as press and sinter or transfer/injection molding and sinter applications.

As noted above, the bodies of this invention are formed from a mixture comprising a borosilazane and silicon carbide powder. The borosilazanes useful herein are generally well known in the art and nearly any which 1) have an acceptable char yield, 2) provide sufficient free carbon on pyrolysis and 3) provide sufficient boron on pyrolysis can be used. With respect to 1, generally the polymer should be capable of being converted to ceramic materials with a ceramic char yield greater than about 20 weight percent. However, since the char yield is inversely related to the shrinkage of the ceramic during firing, those with higher yields, such as greater than about 30 weight percent, are often preferred. With respect to 2, borosilazanes in which the ceramic char contains at least 10 weight percent free carbon are preferred and those containing at least 30 weight percent are more preferred. With respect to 3, those polymers which produce chars containing between about 10 weight percent and about 30 weight percent boron are preferred.

As long as the borosilazane meets these criteria, its structure is not critical. The borosilazane may contain units of general structure [R$_3$Si(NH)$_{0.5}$9, [R$_2$SiNH], [RSi(NH)$_{1.5}$], [B(NH)$_{1.5}$], [RBNH], [R$_2$B(NH)$_{0.5}$] and [Si(NH)$_2$] where each R is independently selected from the group consisting of hydrogen, alkyl radicals containing 1 to 20 carbon atoms such as methyl, ethyl, propyl etc., phenyl radicals, and vinyl radicals. Generally, borosilazanes which contain phenyl groups are preferred since they add to the free carbon in the ceramic chars. Borosilazanes which contain vinyl groups are also preferred since vinyl groups attached to silicon provide a mechanism whereby the borosilazane can be cured prior to sintering. Borosilazanes where R is almost exclusively methyl or hydrogen are generally not suitable for use in this invention as there is insufficient free carbon in the resulting ceramic char. Preferred borosilazanes contain varying amounts of $[PhSi(NH)_{1.5}]$, $[Me_2SiVi(NH)_{0.5}]$, $[B(NH)_{1.5}]$ and $[Ph_2SiNH]$ units, but other units such as $[ViSi(NH)_{1.5}]$, $[PhMeSiNH]$, $[MeHSiNH]$, $[MeViSiNH]$, $[Ph_2SiNH]$, $[Me_2SiNH]$, $[Me_3Si(NH)_{0.5}]$ and the like are also useful. Mixtures of borosilazanes may also be employed herein.

The borosilazanes of this invention can be prepared by techniques well known in the art. The preferred method, however, comprises polymerizing a boron compound, preferably a boron trihalide or borane, and a chlorosilane in the presence of ammonia. Other equivalent methods, however, are also contemplated herein. These include, but are not limited to, those described in U.S. Pat. No. 4,910,173 granted to Niebylski, those described by Haluska in U.S. Pat. No. 4,482,689, those described by Funayama et al., International Symposium on Organosilicon Chemistry Directed Towards Material Science, Abstracts, P. 95-96, Sendai, Japan, Mar. 25-29 (1990), those described by Seyferth et al., J. Am. Ceram. Soc. 73, 2131-2133 (1990), those described by Noth. B. Anorg. Chem. Org. Chem., 16(9), 618-21, (1961), those described by Araud et al. in European Patent No. 364.323 and those described by Funayama et al. in Japanese Kokai Patent No. 2-84437 which are all incorporated herein by reference in their entirety. Specific methods for preparation of suitable borosilazanes are also illustrated in the examples included in the present application.

The preceramic borosilazane is present in the compositions of the present invention at a level in which (a) the amount of boron is 0.1-3 weight percent and (b) the free carbon value of the mixture is greater than 0.1 weight percent, both based on the total weight of the silicon carbide powder and the char derived from the preceramic borosilazane.

What is meant by "free carbon value of the mixture" in this invention is the amount of free or excess carbon derived from the borosilazane during pyrolysis expressed as a weight percentage based on the total weight of the silicon carbide powder and the char derived from the borosilazane. The total amount of carbon in the ceramic char equals the amount of free or excess carbon plus the amount of carbon in the form of silicon carbide.

The boron contained in the ceramic char can be present in the form of boron nitride (thus incorporating some nitrogen in the char), in the form of amorphous boron or the like. As used herein, the boron concentration comprises that present in any of the above forms.

The amount of boron and free carbon derived from the borosilazane is determined by pyrolysis of the borosilazane in the absence of any silicon carbide powder, to an elevated temperature under an inert atmosphere until a stable ceramic char is obtained. For purposes of this invention, a "stable ceramic char" is defined as the ceramic char produced at an elevated temperature which will not significantly decrease in weight upon further exposure at the elevated temperature. Normally, a stable ceramic char is produced upon pyrolysis at 1800° C. for about 30 minutes under argon. Other elevated temperatures can be used to form the stable ceramic char but the length of exposure to the elevated temperature will need to be increased for temperatures less than 1800° C.

Both the ceramic yield and the boron, silicon and carbon content of the stable ceramic char are then determined. Using a rule of mixtures, the amount of SiC and free carbon of the stable ceramic char can be calculated. The amount of free carbon thus calculated and the amount of boron are normally expressed as the amounts produced per gram of preceramic borosilazane. Knowing the amount of boron and free carbon produced by pyrolysis of the borosilazane, one can determine how much borosilazane is required to obtain a borosilazane/silicon carbide mixture with the desired amount of boron and the desired free carbon value. Naturally, if one is using the same or very similar borosilazane to prepare a sintered body, it is not required that the amount of boron and free carbon produced per gram of borosilazane be determined every time.

Using this procedure, the amount of borosilazane required to prepare the compositions of this invention can be determined. This procedure avoids the costly and time consuming trial and error method which might otherwise be required.

This process of determining the amount of borosilazane to be added can be summarized in the following steps:

1) A known weight of the borosilazane is pyrolyzed to stable char;

2) the char is weighed and the result expressed as a weight percent of the starting compound, i.e. the "char yield" of the borosilazane;

3) The resultant char is analyzed for elemental content;

4) Using a rule of mixtures, the amount of "free carbon" in the char is calculated by subtracting the amount of carbon bound to silicon from the total carbon present. The resultant value is expressed as free carbon produced per gram of starting material. The amount of boron produced per gram of starting material is also calculated; and 5) The amount of borosilazane to be added for a given free carbon value or boron concentration is calculated using the following equations:

$$FCV = \frac{(FCB \times B)}{(SiC) + (CYB \times B)}$$

and $$[B] = \frac{(ABB \times B)}{(SiC) + (CYB \times B)}$$

Where FCB grams of Free Carbon produced per gram of the Borosilazane; [B] = concentration of boron in the monolith; FCV = concentration of free carbon in monolith; B = grams of borosilazane; ABB = Amount of Boron produced per gram of Borosilazane; and CYB = Char Yield of the borosilazane.

The free carbon value of the mixture must be greater than 0.1 weight percent based on the total weight of the silicon carbide powder and the char derived from the borosilazane. For free carbon values less than about 0.1 weight percent the density of the sintered body will generally fall below about 2.6 g/cm$^3$ (80% of theoretical). It is generally preferred that the free carbon value of the mixture is greater than 0.5% with the resultant density of the sintered body being greater than about 85% of theoretical. It is more preferred that the free carbon value of the mixture be between 0.5 and 10.0 weight percent with a range of 1.0 to 4.0 weight percent being even more preferred. The optimum density is generally obtained when the free carbon value of the mixture is about 1.5–2.0 weight percent.

If the desired amount of free carbon cannot be incorporated into the polymer, an additional source of carbon may be added. The procedure used for said incorporation is described and claimed in co-pending U.S. patent application Ser. No. 07/458,461, entitled "Multicomponent Binders for SiC Powders" by inventors Gary Thomas Burns, Ronald Keller, Willard Hauth and Chandan Kumar Saha which is incorporated herein by reference in its entirety.

Boron is necessary in the present invention to facilitate sintering. Generally, the amount of boron derived from the borosilazane should be equivalent to about 0.1 to 3.0 weight percent based on the total weight of the silicon carbide powder and the char derived from the borosilazane. Quantities less than this amount will inhibit proper sintering and larger quantities often result in products which do not have the desired density.

If the desired amount of boron cannot be incorporated into the polymer, additional components which facilitate sintering may be added to the mixture. These include iron, Fe$_3$C, magnesium, MgC$_3$, lithium, Li$_2$C$_2$, beryllium, Be$_2$C, boron, boron-containing compounds, aluminum, aluminum-containing compounds, and metal oxides such as thorium oxide, yttrium oxide, lanthanum oxide, and cerium oxide. Many of these metal-containing sintering aids are described in Negita, "Effective Sintering Aids for Silicon Carbide Ceramics: Reactivities of Silicon Carbide with Various Additives," 69 J. Am. Ceram. Soc. C-308 (1986). Other metal-containing sintering aids suggested by Negita might also be effective in the practice of this invention. Preferred sintering aids are selected from the group consisting of boron, boron-containing compounds, aluminum, and aluminum-containing compounds. Examples of boron-containing sintering aids include boron carbide, lithium borohydride, trivinylboron, triphenylboron, silicon hexaboride, H$_3$BO$_3$, B$_2$O$_3$, and the like. Examples of aluminum-containing sintering aids include aluminum oxide, aluminum nitride, aluminum diboride, and the like. The most preferred sintering aids are boron and boron carbide. Mixtures of sintering aids may also be used.

The compositions of the invention also include silicon carbide powders. Many of these materials are commercially available and well known in the art. Both alpha-SiC and beta-SiC powders, as well as mixtures, can be used. Generally, SiC powders with an average particle size of less than about ten microns are preferred. Powders with an average particle size of less than five microns are more preferred and those with an average particle size less than 1 micron are even more preferred.

The compositions of this invention may also contain curing agents which are used to crosslink the borosilazane prior to sintering. The green bodies produced thereby generally have higher strengths than the uncured articles and, thus, can better withstand any handling or machining processes prior to sintering. These curing agents may be activated by heating the green body containing the curing agent to temperatures in the range of 50°–300° C. (i.e., the activation of a free radical precursor) or they may be crosslinked at room temperature.

Such curing agents are well known in the art. Examples include free radical precursors such as organic peroxides, for instance dibenzoyl peroxide, bis-p-chlorobenzol peroxide, bis-2,4dichlorobenzol peroxide, di-t-butyl peroxide, dicumyl peroxide, t-butyl perbenzoate, 2,5-bis(t-butylperoxy)-2,3-dimethylhexane and t-butyl peracetate; and platinum-containing curing agents such as platinum metal, H$_2$PtCl$_6$, and ((C$_4$H$_9$)$_3$P)$_2$PtCl$_2$. Other conventional curing agents known in the art may also be used. The curing agent is present in an effective amount, i.e. an amount sufficient to induce crosslinking in the borosilazane. Therefore, the actual amount of the curing agent will depend on the activity of the actual agent used and the amount of borosilazane present. Normally, however, the peroxide curing agent will be present at about 0.1 to 5.0 weight percent based on the weight of the compound to be cured with the preferred amount being about 2.0 weight percent. When platinum-containing curing agents are used, the amount will normally be such that platinum is present at about 1 to 1000 ppm based on the weight of the compound to be cured with the preferred amount being about 50 to 150 ppm platinum.

Examples of room temperature crosslinking agents include, for example, polyfunctional organosilicon compounds such as silanes, silazanes or siloxanes. The preferred crosslinking agents are silazanes with Si-H functional bonds.

The addition of other processing aids such as lubricants, deflocculants and dispersants is also within the scope of this invention. Examples of such compounds include stearic acid, mineral oil, paraffin, calcium stearate, aluminum stearate, succinic acid, succinimide, succinic anhydride or various commercial products such as Oloa 1200 TM.

The desired amounts of the various components are combined in a manner which assures a uniform and intimate mixture so that areas of varying density throughout the sintered product are avoided. These mixtures can be produced by using conventional blending techniques such as grinding the various powders in either the dry or wet state or ultrasonic dispersion. Generally preferred is wet grinding where the various powders are mixed and ground with organic solvents and the solvent thereafter removed. Other mixing and grinding methods will be apparent to those skilled in the art.

The uniform and intimate mixture may then be formed into handleable green bodies of the desired shape. The expression "handleable green bodies" is used to describe green bodies which have sufficient green strength to be handled or machined to a desired shape prior to sintering. Generally, green strengths of 500 psi or more may be obtained in the practice of this invention.

The green bodies may be formed by conventional techniques known in the art. Such methods include pressure molding, uniaxial pressing, isopressing, extrusion, transfer molding, injection molding, and the like. The present invention is particularly advantageous in this respect since the composition of the preceramic mixture can easily be changed to accommodate the use of multiple molding techniques without affecting the quality of the sintered product.

The above formed body is preferably cured prior to its final shaping. Curing procedures are well known in the art. Generally, such curing can be carried out by heating the article to a temperature in the range of about 50° to 450° C., preferably in an inert atmosphere such as argon or nitrogen.

Because the preceramic mixture includes a borosilazane, green bodies formed by the above techniques are generally strong enough to be handled or further shaped by methods such as machining, milling etc. This not only alleviates the problems associated with handling fragile objects, but it allows for the production of more complex shapes through flexibility in product design.

Once the final shape has been obtained, the article is sintered in an inert atmosphere and/or under vacuum to a temperature of 1900° C. or more. The preferred sintering temperature is about 1950° to 2200° C. with about 2070° C. being most preferred.

The compositions of this invention may be sintered either under pressure or by using a pressureless process. Since the sintering process employing pressure will generally produce ceramic articles with higher density, such a method would be preferred if maximum density were desired. Generally, however, the pressureless sintering process is preferred because of the simplified operations involved.

Inert atmospheres are used during pyrolysis to prevent oxygen incorporation into the ceramic. The sintering process as well as the density of the sintered product are thereby enhanced. For purposes of this invention, an inert atmosphere is meant to include an inert gas, vacuum or both. If an inert gas is used it may be, for example, argon, helium or nitrogen. If a vacuum is used it may be, for example, in the range of 0.1–200 torr, preferably 0.1–0.3 torr. Exemplary of a combined process might be firing the composition in argon up to 1150° C., firing from 1150° to 1575° C. in a vacuum and firing from 1575° to 2070° C. under argon.

The use of nitrogen during sintering may be particularly preferred since it can reduce the conversion of beta-SiC to alpha-SiC grains. The inhibition of his conversion is seen as a particular advantage in ceramic formation since large alpha SiC grains prevent ultimate densification and, thus, may be the site of a flaw in the ceramic product. However, since the use of nitrogen decreases the rate of sintering, increased firing temperatures are often necessary.

Sintering may be performed in any conventional high temperature furnace equipped with a means to control the furnace atmosphere. Such furnaces are well known in the art and many are commercially available.

The temperature schedule for sintering depends on both the volume of parts to be fired and the composition of the mixture. For smaller objects the temperature may be elevated relatively rapidly. For larger objects or those with large concentrations of the borosilazane, however, more extended programs are needed to create uniform ceramic bodies.

Although not wishing to be limited by theory, it is thought that the free carbon derived from the borosilazane plays two different roles in the formation of highly densified sintered bodies. First, it helps remove oxygen present in the silicon carbide powder; and secondly, it apparently acts as an additional sintering aid. Silicon carbide powders often contain so called "free carbon." However, the "free carbon" present in the silicon carbide powder does not appear to be as active or effective as free carbon generated in situ from the borosilazane. It is not clear whether the free carbon produced in situ is more active chemically or whether it is simply more evenly dispersed. In any event, when the free carbon value of the mixture (as defined earlier) is about 1.5 weight percent, sintered bodies with maximum densities are obtained.

Additionally, it is thought that the incorporation of boron form the borosilazane is advantageous since incorporation in this manner provides a more even distribution and, thus, lower overall levels can be used. Moreover, even at these lower levels, the bodies have higher densities and higher average strength than those in which boron is incorporated separately.

By the above methods, ceramic articles having densities greater than about 80% of theoretical are formed. It is preferred that the density of the ceramic article be greater than about 85% of theoretical (2.7 g/cm$^3$). It is more preferred that the density be greater than about 2.9 g/cm$^3$ (90% of theoretical); it is most preferred that the density be greater than about 3.05 g/cm$^3$ (95% of theoretical).

So that those skilled in the art can better appreciate and understand the invention, the following examples are given. Unless otherwise indicated, all percentages are by weight. Throughout this specification "Me" represents a methyl group, "Ph" represents a phenyl group, "Vi" represents a vinyl group and "B" represents the boron content.

In the following examples, the analytical methods used were as follows:

Proton NMR spectra were recorded on a Varian EM390 spectrometer and the results presented herein in ppm; fournier transform IR spectra were recorded on a Perkin Elmer Series 1600 spectrometer. Gel permeation chromatography (GPC) data were obtained on a Waters GPC equipped with a model 600E systems controller, a model 490 UV and model 410 Differential Defractometer detectors; all values are relative to polystyrene. TMA data were recorded on a Du Pont 940 thermomechanical analyzer (TMA) interfaced to an Omnitherm 2066 Computer.

Carbon, hydrogen and nitrogen analysis were done on a Control Equipment Corporation 240-XA Elemental Analyzer. Silicon and boron were determined by a fusion technique which consisted of converting the material to soluble forms of silicon and boron and analyzing the solute for total silicon or boron by atomic absorption spectrometry.

Test bars were formed on a Carver laboratory press (Fred S. Carver Inc., Summit, N.J.). Pyrolysis was carried out in an Astro graphite element tube furnace Model 1000-3060-FP12 equipped with an Eurotherm Controller/Programmer Model 822. The furnace was equipped with an Ircon Modeline Plus optical pyrometer to monitor the temperature above 900° C. Fired densities were measured by water immersion techniques according to ASTM C373-72. Machined test bars were prepared according to Mil. Std. 1942 (MR). Flex strengths (using the four-point bend technique) were determined on either a Model TTC or Model 8562 Instron instrument.

The SiC powder used was IBIDEN BETARUNDUM UF ™ silicon carbide which is a mixture of about 5 to 8% alpha-SiC and 95 to 92% beta-SiC. The boron used was amorphous boron nitride powder from Herman Stark.

EXAMPLE I

Preparation of Sintered Test Bars with $(PhSi(NH)_{1.5})_{0.15}(B(NH)_{1.5})_{0.22}(Ph_2SiViO_{0.5})_{0.25}(C_3H_6SiNH)_{0.38}$

A. Polymer Synthesis 53.6 g (0.38 mole) of $C_3H_6SiCl_2$, 63.2 g (0.25 moles) $Ph_2SiCl_2$, 31.7 g (0.15 mole) $PhSiCl_3$ and 55 g (0.22 mole) $BBr_3$ were placed in a 3 L 3 necked flask fitted with an overhead stirrer under argon. The above mixture was dissolved in 1.5 L of toluene and cooled to $-78°$ C. with a dry ice isopropyl alcohol bath. Ammonia was then added to the reaction subsurface at a rate which did not allow the reaction to warm above 10° C. internal temperature. After 2 hours the ammonia was stopped, the ice bath removed and the reaction allowed to warm to ambient temperatures over a 16 hour period. The toluene solution was filtered and the filtrate concentrated in vacuo. The resulting polymer was stripped at 150° C. to remove all volatiles. An 89.5% yield of the resin was obtained. $^1$H NMR (CDCl$_3$) 0.60-2.0 (SiC$_3$H$_6$, broad overlapping multiplet), 7.0-7.9 (Si-Ph, broad singlet): calculated mole ratio of SiPh/SiC$_3$H$_6$=1.70/1.0, found 1.51/1.00. IR (thin film on KBr disc) cm$^{-1}$ (intensity): 3385 (m). 3050 (m), 2940 (m), 1960 (w), 1900 (w), 1985 (w), 1590 (w), 1430 (s), 1370 (vs), 1250 (s), 1170 (vs), 1115 (s), 1010 (m), 930 (vs), 787 (m), 739 (m), 697 (m). The TMA softening point ($T_g$) of the resin was 81.5° C. TGA char yield at 1000° C. was 65.4%. The GPC molecular weight was $M_w=4824$, $M_n=484$, and $M_z=38326$. The elemental analysis showed 13.0 wt % nitrogen. 54.28 wt % carbon, 5.67 wt % hydrogen, 19.9 wt % silicon and 2.47 wt % boron.

B. Polymer Pyrolysis and Char Composition Calculations

A sample of the above resin was cross-linked at 200° C. for 3 hours in an argon atmosphere and then placed in a graphite crucible. The crucible was transferred to an Astro tube furnace. The tube furnace was evacuated to less than 20 torr and then backfilled with argon. This procedure was repeated twice. Under a purge of argon, the sample was heated to 2000° C. at approximately 10° C./minute and held at temperature for 1 hour before cooling to room temperature. The sample had a mass retention of 50.78%. The elemental composition of the char was 47.55% carbon. 4.82% nitrogen, 4.48% boron and 39.0% silicon. The following calculation was made based upon the carbon and boron analyses: 100 g of cured polymer gives 50.78 g of a ceramic char consisting of 43.15% (by difference) silicon, 47.55% carbon, 4.82% nitrogen, and 4.48% boron. The char consists of 31.3 g of SiC (61.6%), 5.23 g BN (10.3%) and 14.25 g of excess C (28.1%). Therefore, every gram of polymer gives 0.313 g of SiC, 0.052 g of BN and 0.143 g of excess carbon.

C. Test Bar Fabrication and Testing 1) 44.0 g of SiC powder was ultrasonically dispersed in a toluene solution of 6.0 g of the resin produced in part A. (FCV=1.8%, [B]=0.29%). The solvent was removed in vacuo. The residue was ground and passed through a 90 micron sieve. The sieved powder was uniaxially pressed into $35\times8\times$ca. 3 mm test bars at 47 ksi. The test bars were cured for 3 hours at 225° C. in an argon atmosphere (room temperature to 225° C. at 1° C./minute). The density of the cured test bars averaged $2.054\pm0.005$ g/cm$^3$ (n=6) by methanol immersion. The average 4-pt MOR flexural strength of the cured test bars was $1780\pm295$ psi. Aliquots of the cured test bars were fired to 2100° C. using a temperature program of 5° C./minute from room temperature to 2100° C. with vacuum employed from 1150° to 1400° C. and a 1 hour hold at 2100° C. The density of the fired test bars averaged $3.154\pm0.01$ g/cm$^3$ and the average 4 pt MOR flexure strength was $68.32\pm8.19$ ksi.

EXAMPLE II

Preparation of Sintered Test Bars with $(MeViSiNH)_{0.35}(Ph_2SiNH)_{0.25}(PhSi(NH)_{1.5})_{0.15}(B(NH)_{1.5})_{0.25}$

A. Polymer Synthesis 49.3 g (0.35 mole) of MeViSiCl$_2$, 63.2 g (0.25 moles) Ph$_2$SiCl$_2$, and 31.7 g (0.15 mole) PhSiCl$_3$ were placed in a 2 L 3 necked flask fitted with an overhead stirrer under argon. The above mixture was dissolved in 1.0 L of toluene and cooled to $-78°$ C. with a dry ice isopropyl alcohol bath. Ammonia was then added to the reaction subsurface at a rate which did not allow the reaction to warm above 10° C. internal temperature. After 2 hours the ammonia was stopped the ice bath removed and the reaction allowed to warm to ambient temperatures over a 16 hour period. The toluene solution was filtered and the filtrate returned to the above reaction flask where 62.0 g (0.25 mole) BBr$_3$ was added over a 30 minute period. The mixture was refluxed for 3 hours to insure consumption of BBr$_3$. The reaction was cooled back to $-78°$ C. and ammonia added to the subsurface. After 3 hours the ammonia was stopped, the ice bath removed and the reaction allowed to return to ambient temperatures over a 16 hour period. The toluene solution was filtered and the filtrate concentrated in vacuo. The resulting polymer was stripped at 150° C. to remove all volatiles. An 87.2% yield of the resin was obtained. $^1$H NMR (CDCl$_3$) 0.40-0.3 (SiMe broad singlet), 5.3-6.0 (SiVi broad multiplet), 6.6-7.8 (Si-Ph broad multiplet): calculated mole ratio of SiMe/SiVi/SiPh=0.26/0.26/0.48, found 0.245/0.245/0.510. IR (thin film on KBr disc); cm$^{-1}$ (intensity): 3386 (m), 3046 (m), 2944 (w), 1958 (w), 1898 (w), 1824 (w), 1590 (w), 1427 (s), 1368 (vs), 1253 (s), 1170 (vs), 1115 (s), 1009 (m), 928 (vs), 791 (m), 737 (m), 700 (m). The TMA softening point ($T_g$) or the resin was 72.8° C. TGA char yield at 1000° C. was 62.2%. The GPC molecular weight was $M_w=15518$, $M_n=750$, and $M_z=66458$. The elemental analysis showed 14.2 wt % nitrogen, 54.3 wt % carbon, 5.8 wt % hydrogen, 19.9 wt % silicon and 2.82 wt % boron.

B. Polymer Pyrolysis and Char Composition Calculations

A blend of 5 g of the resin formed in part A and 0.05 g of Lupersol 101 (2,5-bis(t-butylperoxy)-2,3-dimethylhexane) was prepared. An aliquot of the blend was crosslinked at 200° C. for 3 hours in an argon atmosphere. An aliquot of the crosslinked polymer was weighed into a graphite crucible. The crucible was transferred into an Astro tube furnace. The furnace was evacuated to <20 torr and then backfilled with argon. This procedure was repeated twice. Under a purge of argon, the sample was heated to 2000° C. at approximately 10° C./minute and held at temperature for 1 hours before cooling to room temperature. The sample had a mass retention of 61.27%. The elemental composition of the char was 48.47% carbon, 9.87% nitrogen, 4.84% boron and 39.2% silicon. The following calculation was made based upon the carbon and boron analyses: 100 g of cured polymer gives 61.27 g of a ceramic 47 ksi. The test bars were cured for 3 hours at 225° C. in an argon atmosphere (room temperature to 225° C. at 1° C./minute). Aliquots of the cured test bars were fired to 2100° C. using a temperature program of 5° C./minute from room temperature to 2100° C. with vacuum employed from 1150° to 1400° C. and a 1 hour hold at 2100° C.

TABLE 1

| Ex. No. | % binder silazane | % binder B-silazane | Sintering Aid | Wt % boron | Cured Density | Sintered Density | Sintered MOR (ksi) |
|---|---|---|---|---|---|---|---|
| 3  | 12 | 0  | BN         | 0.28  |             | 3.07 ± 0.01 | 63.54 ± 5.57 |
| 4  | 12 | 0  | BN         | 0.194 | 2.11 ± 0.01 | 2.57 ± 0.02 | 38.56 ± 2.49 |
| 5  | 12 | 0  | BN         | 0.148 | 2.15 ± 0.01 | 2.52 ± 0.04 | 38.08 ± 3.78 |
| 6  | 12 | 0  | BN         | 0.102 | 2.10 ± 0.01 | 2.23 ± 0.07 | 24.22 ± 2.94 |
| 7  | 12 | 0  | BN         | 0.046 | 2.12 ± 0.01 | 2.07 ± 0.01 | 21.84 ± 1.91 |
| 1  | 0  | 12 | B-silazane | 0.28  | 2.05 ± 0.01 | 3.15 ± 0.01 | 68.32 ± 8.19 |
| 8  | 2  | 10 | B-silazane | 0.235 | 2.07 ± 0.01 | 3.11 ± 0.01 | 76.10 ± 6.71 |
| 9  | 4  | 8  | B-silazane | 0.19  | 2.07 ± 0.01 | 3.07 ± 0.01 | 71.84 ± 6.71 |
| 10 | 6  | 6  | B-silazane | 0.145 | 2.08 ± 0.01 | 2.74 ± 0.01 | 53.34 ± 5.75 |
| 11 | 4  | 8  | B-silazane | 0.97  | 2.08 ± 0.01 | 2.72 ± 0.03 | 48.80 ± 2.46 |
| 12 | 2  | 10 | B-silazane | 0.048 | 2.08 ± 0.01 | 2.22 ± 0.06 | 26.86 ± 2.46 |

B-silazane = borosilazane; Density provided in g/cc char consisting of 36.82% (by difference) silicon, 48.47% carbon, 9.87% nitrogen, and 4.84% boron. The char consists of 32.23 g of SiC (52.6%), 6.18 g BN (10.1%) and 22.23 g of excess C (36.3%). Therefore, every gram of polymer gives 0.322 g of SiC, 0.068 g of BN and 0.222 g of excess carbon.

C. Test Bar Fabrication and Testing 1) 44.0 g of SiC powder was ultrasonically dispersed in a toluene solution of 6.0 g of the resin produced in part A and 0.2 g Lupersol 101. (FCV=2.8%, [B]=0.39%). The solvent was removed in vacuo. The residue was ground and passed through a 90 micron sieve. The sieved powder was uniaxially pressed into 35×8×ca. 3 mm test bars at 47 ksi. The test bars were cured for 3 hours at 225° C. in an argon atmosphere (room temperature to 225° C. at 1° C./minute). The density of the cured test bars averaged 2.07±0.012 g/cm$^3$ (n=6) by methanol immersion. The average 4-pt MOR flexural strength of the cured test bars was 1215±506 psi. Aliquots of the cured test bars were fired to 2100° C. using a temperature program of 5° C./minute from room temperature to 2100° C. with vacuum employed from 1150° to 1400° C. and a 1 hour hold at 2100° C. The density of the fired test bars averaged 3.145±0.007 g/cm$^3$ and the average 4 pt MOR flexure strength was 66.71±6.49 ksi.

EXAMPLES III-XII

For comparative purposes, test bars were fabricated using a silazane polymer of the structure (C$_3$H$_6$SiNH)$_{0.50}$(Ph$_2$SiNH)$_{0.25}$(PhSi(NH)$_{1.5}$)$_{0.25}$ which was prepared by the method of Burns et al. in Example 1 of U.S. Pat. No. 4,962,069 and boron nitride powder in the amounts described in Table 1. It is clear from this Example that boron added to the above silazane in the form of the borosilazane of Example 1 herein is more effective than the use of BN powder. The following is the generic test bar fabrication methodology used. The amounts of ingredients as well as the results are set forth in Table 1.

Silicon carbide powder and boron nitride powder, if used, was ultrasonically dispersed in a toluene solution of the silazane and borosilazane (if used). The solvent was removed in vacuo. The residue was ground and passed through a 90 micron sieve. The sieved powder was uniaxially pressed into 35×8×ca. 3 mm test bars at

EXAMPLE XIII

Preparation of Sintered Test Bars with a BH$_3$ modified silazane.

A. Polymer Synthesis 26.0 g (0.20 mole) of Me$_2$SiCl$_2$, 100.0 g (0.4 moles) Ph$_2$SiCl$_2$, and 85.0 g (0.4 mole) PhSiCl$_3$ were placed in a 2 L 3 necked flask fitted with an overhead stirrer under argon. The above mixture was dissolved in 1.0 Kg of toluene and cooled to −78° C. with a dry ice isopropyl alcohol bath. Ammonia was then added to the reaction subsurface at a rate which did not allow the reaction to warm above 10° C. internal temperature. After 2 hours the ammonia was stopped, the ice bath removed and the reaction allowed to warm to ambient temperatures over a 16 hour period. The toluene solution was filtered and the filtrate placed in a roto-evaporator until a viscous oil was obtained. 153 g of this viscous oil was dissolved in toluene (150 g), filtered and placed in a 1 L 3 necked flask under argon fitted with an overhead stirrer and an addition funnel. 275 mL of a 1 molar BH$_3$-THF solution in toluene was placed in the addition funnel and added over a 30 minute period. This addition was accompanied by a 10° C. exotherm to a reaction temperature of 30° C. The resulting solution was stirred for about 12 hours and the solvent the removed under vacuum with mild heat. The resulting resin was dissolved in toluene, filtered and stripped in vacuo to yield 146 g of a brittle resin. IR (thin film on KBr disc); cm$^{-1}$ (intensity): 3386 (m), 3046 (m), 2944 (w), 2450 (m), 1958 (w), 1898 (w), 1824 (w), 1590 (w), 1427 (s), 1368 (vs), 1253 (s), 1170 (vs), 1115 (s), 1009 (m), 928 (vs), 791 (m), 737 (m), 700 (m). The TMA softening point (T$_g$) or the resin was 72.8° C. TGA char yield at 1000° C. was 57.2%. The GPC molecular weight was M$_w$=4362, M$_n$=404, and M$_z$=7197. The elemental analysis showed 10.6 wt % nitrogen 61.6 wt % carbon, 6.5 wt % hydrogen, 16.5 wt % silicon.

Polymer Pyrolysis and Char Composition Calculations

A sample of the above resin was cross-linked at 200° C. for 3 hours in an argon atmosphere and then placed in a graphite crucible. The crucible was transferred to an Astro tube furnace. The tube furnace was evacuated to less than 20 torr and then backfilled with argon. This procedure was repeated twice. Under a purge of argon, the sample was heated to 2000° C. at approximately 10° C./minute and held at temperature for 1 hour before cooling to room temperature. The sample had a mass retention of 42.87%. The elemental composition of the char was 52.5% carbon, 9.5% nitrogen, 1.7% boron and 33.7% silicon. The following calculation was made based upon the carbon and boron analyses: 100 g of cured polymer gives 42.87 g of a ceramic char consisting of 43.6% (by difference) silicon, 52.5% carbon, 2.2% nitrogen, and 1.7% boron. The char consists of 26.7 g of SiC (62.3%), 1.67 g BN (3.9%) and 14.49 g of excess C (33.79%). Therefore, every gram of polymer gives 0.267 g of SiC, 0.017 g of BN and 0.145 g of excess carbon.

C. Test Bar Fabrication and Testing

Silicon carbide powder was ultrasonically dispersed in a toluene solution of the borosilazane formed in part A in the amounts specified in Table 2. The solvent was removed in vacuo. The residue was ground and passed through a 90 micron sieve. The sieved powder was uniaxially pressed into 35×8×ca. 3 mm test bars at 47 ksi. The test bars were cured for 3 hours at 225° C. in an argon atmosphere (room temperature to 225° C. at 1° C./minute). Aliquots of the cured test bars were fired to 2100° C. using a temperature program of 5° C./minute from room temperature to 2100° C. with vacuum employed from 1150° to 1400° C. and a 1 hour hold at 2100° C. The following Table summarizes the results:

TABLE 2

| Weight % Binder | Weight % Boron | Cured Density | Sintered Density |
|---|---|---|---|
| 5 | 0.04 | 1.928 | 2.063 |
| 10 | 0.08 | 2.010 | 2.419 |
| 15 | 0.12 | 2.110 | 2.998 |

These results clearly show that silazane polymers can be converted to borosilazanes which are suitable as binders for the preparation of high density sintered bodies.

That which is claimed is:

1. A method of preparing a sintered body of silicon carbide, said method comprising:
   (a) blending components consisting essentially of silicon carbide powder and a preceramic borosilazane to a uniform mixture, where the amount of preceramic borosilazane is such that (i) the amount of boron in the mixture is 0.1-3 weight percent based on the total weight of the silicon carbide powder and the char derived from the preceramic borosilazane and (ii) the free carbon value of the mixture is greater than 0.1 weight percent based on the total weight of the silicon carbide powder and the char derived from the preceramic borosilazane;
   (b) forming the uniform mixture into a shape under pressure at a temperature less than about 500° C. to obtain a handleable green body; and
   (c) sintering the handleable green body in an inert atmosphere at a temperature greater than 1900° C. to obtain a sintered body of silicon carbide with a density greater than 2.6 g/cm$^3$.

2. The method of claim 1 wherein the boron content and the free carbon content of the char derived from the preceramic borosilazane is determined, prior to forming a handleable green body, by heating a known amount of the preceramic borosilazane under an inert atmosphere to an elevated temperature for a time sufficient to convert the preceramic borosilazane into a stable ceramic char material, determining the stable ceramic char yield and the silicon, carbon and boron content of the stable ceramic char material, and then calculating the amount of free carbon and boron in the stable ceramic char material per part of the preceramic borosilazane.

3. The method of claim 2 wherein the preceramic borosilazane is present at such a level that the free carbon value of the mixture is between 0.5 and 10.0 weight percent.

4. The method of claim 2 wherein the preceramic borosilazane contains [RSi(NH)$_{1.5}$], [R$_2$SiNH], [R$_3$Si(NH)$_{0.5}$], [R$_2$B(NH)$_{0.5}$], [RBNH] and [B(NH)$_{1.5}$] units where each R is independently selected from the group consisting of hydrogen, alkyl radicals containing 1 to 20 carbon atoms, phenyl radicals and vinyl radicals.

5. The method of claim 2 wherein the preceramic borosilazane is present at such a level that the free carbon value of the mixture is between 0.5 and 3 weight percent and the handleable green body is sintered at a temperature of 2000° to 2200° C.

6. The method of claim 2 wherein additional carbon is blended into the uniform mixture.

7. A method of forming a handleable green body comprising:
   (i) blending components consisting essentially of silicon carbide powder and a preceramic borosilazane to a uniform mixture, where the amount of preceramic borosilazane is such that (a) the amount of boron in the mixture is 0.1-3 weight percent based on the total weight of the silicon carbide powder and the char derived from the preceramic borosilazane and (b) the free carbon value of the mixture is greater than 0.1 weight percent based on the total weight of the silicon carbide powder and the char derived from the preceramic borosilazane, and
   (ii) forming the uniform mixture into a shape under pressure at a temperature less than about 500° C.

8. The method of claim 7 wherein the boron content and the free carbon content of the char derived from the preceramic borosilazane is determined, prior to forming a handleable green body, by heating a known amount of the preceramic borosilazane under an inert atmosphere to an elevated temperature for a time sufficient to convert the preceramic borosilazane into a stable ceramic char material, determining the stable ceramic char yield and the silicon, carbon and boron content of the stable ceramic char material, and then calculating the amount of free carbon and boron in the stable ceramic char material per part of the preceramic borosilazane.

9. The method of claim 8 wherein the preceramic borosilazane is present at such a level that the free carbon value of the mixture is between 0.5 and 10.0 weight percent.

10. The method of claim 8 wherein the preceramic borosilazane contains [RSi(NH)$_{1.5}$], [R$_2$SiNH], [R$_3$Si(NH)$_{0.5}$], [R$_2$B(NH)$_{0.5}$], [RBNH] and [B(NH)$_{1.5}$] units where each R is independently selected from the group consisting of hydrogen alkyl radicals containing 1 to 20 carbon atoms, phenyl radicals, and vinyl radicals.

11. The method of claim 8 wherein additional carbon is blended into the uniform mixture.

12. A uniform mixture consisting essentially of silicon carbide powder and a preceramic borosilazane, where the amount of preceramic borosilazane is such that (a)

the amount of boron in the mixture is 0.1–3 weight percent based on the total weight of the silicon carbide powder and the char derived from the preceramic borosilazane and (b) the free carbon value of the mixture is greater than 0.1 weight percent based on the total weight of the silicon carbide powder and the char derived from the preceramic borosilazane.

13. The uniform mixture of claim 12 wherein the preceramic borosilazane is present at such a level that the free carbon value of the mixture is between 0.05 and 10.0 weight percent.

14. The uniform mixture of claim 12 wherein the preceramic borosilazane contains [RSi(NH)$_{1.5}$], [R$_2$SiNH], [R$_3$Si(NH)$_{0.5}$], [R$_2$B(NH)$_{0.5}$], [RBNH] and [B(NH)$_{1.5}$] units were each R is independently selected from the group consisting of hydrogen, alkyl radicals containing 1 to 20 carbon atoms, phenyl radicals, and vinyl radicals.

15. The uniform mixture of claim 12 wherein additional carbon is blended into the uniform mixture.

16. A method of preparing a sintered body of silicon carbide, said method comprising:
(a) blending components consisting essentially of silicon carbide powder, a preceramic borosilazane and a curing agent for the preceramic borosilazane to a uniform mixture, where the amount of curing agent is an effective amount to cure the preceramic borosilazane and the amount of preceramic borosilazane is such that (i) the amount of boron in the mixture is 0.1–3 weight percent based on the total weight of the silicon carbide powder and the char derived from the preceramic borosilazane and (ii) the free carbon value of the mixture is greater than 0.1 weight percent based on the total weight of the silicon carbide powder and the char derived from the preceramic borosilazane;
(b) forming the uniform mixture into a shape under pressure at a temperature less than about 500° C. to obtain a handleable green body; and
(c) sintering the handleable green body in an inert atmosphere at a temperature greater than 1900° C. to obtain a sintered body of silicon carbide with a density greater than 2.6 g/cm$^3$.

17. A method of forming a handleable green body comprising:
(i) blending components consisting essentially of silicon carbide powder, a preceramic borosilazane and a curing agent for the preceramic borosilazane to a uniform mixture, where the amount of curing agent is an effective amount to cure the preceramic borosilazane and the amount of preceramic borosilazane is such that (a) the amount of boron in the mixture is 0.1–3 weight percent based on the total weight of the silicon carbide powder and the char derived from the preceramic borosilazane and (b) the free carbon value of the mixture is greater than 0.1 weight percent based on the total weight of the silicon carbide powder and the char derived from the preceramic borosilazane, and
(ii) forming the uniform mixture into a shape under pressure at a temperature less than about 500° C.

18. A uniform mixture consisting essentially of silicon carbide powder, a preceramic borosilazane and a curing agent for the preceramic borosilazane, where the amount of curing agent is an effective amount to cure the preceramic borosilazane and the amount of preceramic borosilazane in such that (a) the amount of boron in the mixture is 0.1–3 weight percent based on the total weight of the silicon carbide powder and the char derived from the preceramic borosilazane and (b) the free carbon value of the mixture is greater than 0.1 weight percent based on the total weight of the silicon carbide powder and the char derived from the preceramic borosilazane.

19. The method of claim 16 wherein the borosilazane curing agent is selected from the group consisting of an organic peroxide which is present at 0.1 to 5.0 weight percent based on the weight of the borosilazane and a polyfunctional organosilicon compound with Si-H functional units.

20. The method of claim 17 wherein the borosilazane curing agent is selected from the group consisting of an organic peroxide which is present at 0.1 to 5.0 weight-percent based on the weight of the borosilazane and a polyfunctional organosilicon compound with Si-H functional units.

21. The uniform mixture of claim 18 wherein the borosilazane curing agent is selected from the group consisting of an organic peroxide which is present at 0.1 to 5.0 weight percent based on the weight of the borosilazane and a polyfunctional organosilicon compound with Si-H functional units.

* * * * *